US009325687B2

(12) United States Patent
Caldeira de Andrada et al.

(10) Patent No.: US 9,325,687 B2
(45) Date of Patent: Apr. 26, 2016

(54) REMOTE AUTHENTICATION USING MOBILE SINGLE SIGN ON CREDENTIALS

(71) Applicant: CELLCO PARTNERSHIP, Basking Ridge, NJ (US)

(72) Inventors: Mauricio Pati Caldeira de Andrada, South Plainfield, NJ (US); Samir Vaidya, Highland Park, NJ (US); Mohammad Raheel Khalid, Budd Lake, NJ (US); Ji Hoon Kim, Lyndhurst, NJ (US); Cory Michael Bruno, South River, NJ (US); Paul Berman, Roselle Park, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 14/069,080

(22) Filed: Oct. 31, 2013

(65) Prior Publication Data
US 2015/0121496 A1   Apr. 30, 2015

(51) Int. Cl.
*G06F 7/04* (2006.01)
*H04L 29/06* (2006.01)

(52) U.S. Cl.
CPC ............ *H04L 63/08* (2013.01); *H04L 63/0853* (2013.01); *H04L 63/0861* (2013.01)

(58) Field of Classification Search
CPC ..... H04L 63/08; H04L 63/18; H04L 63/0861; H04L 63/0853
See application file for complete search history.

(56) References Cited

U.S. PATENT DOCUMENTS

| | | | |
|---|---|---|---|
| 6,459,988 B1 * | 10/2002 | Fan et al. | ...... 701/468 |
| 6,490,443 B1 | 12/2002 | Freeny | |
| 6,594,765 B2 | 7/2003 | Sherman et al. | |
| 6,607,136 B1 | 8/2003 | Atsmon et al. | |
| 6,732,278 B2 | 5/2004 | Baird et al. | |
| 7,076,797 B2 | 7/2006 | Loveland | |
| 7,610,616 B2 | 10/2009 | Masuouka et al. | |
| 7,672,644 B2 | 3/2010 | Sun et al. | |
| 7,685,629 B1 * | 3/2010 | White et al. | ...... 726/2 |
| 8,005,075 B1 | 8/2011 | Webster et al. | |
| 8,059,542 B1 | 11/2011 | Oroskar et al. | |
| 8,443,425 B1 | 5/2013 | Evans et al. | |
| 8,646,060 B1 | 2/2014 | Ben Ayed | |
| 2003/0084171 A1 | 5/2003 | de Jong et al. | |
| 2005/0105734 A1 | 5/2005 | Buer et al. | |
| 2007/0136573 A1 | 6/2007 | Steinberg | |
| 2008/0022375 A1 | 1/2008 | Stanley | |
| 2009/0037732 A1 | 2/2009 | Boccon-Gibod et al. | |
| 2009/0132813 A1 * | 5/2009 | Schibuk | ...... 713/158 |
| 2009/0247186 A1 | 10/2009 | Ji et al. | |
| 2009/0265775 A1 | 10/2009 | Wisely et al. | |
| 2010/0022254 A1 | 1/2010 | Ashfield et al. | |
| 2011/0258689 A1 | 10/2011 | Cohen et al. | |

(Continued)

*Primary Examiner* — Techane Gergiso

(57) ABSTRACT

Systems and methods for remote authentication using mobile single sign on credentials are disclosed. In some implementations, a proxy server receives, from a web access device, a request to access a secure online resource via the web access device. The proxy server receives, from a mobile device different from the web access device, one or more credentials for accessing the secure online resource. The proxy server determines that a geographic distance between the web access device and the mobile device is less than a geographic distance threshold. Upon determining that the geographic distance between the web access device and the mobile device is less than the geographic distance threshold, the proxy server enables the web access device access to the secure online resource.

19 Claims, 4 Drawing Sheets

(56) References Cited

U.S. PATENT DOCUMENTS

| | | |
|---|---|---|
| 2011/0271331 A1 | 11/2011 | Adams et al. |
| 2012/0185166 A1* | 7/2012 | Chiang et al. ............... 701/445 |
| 2012/0196566 A1* | 8/2012 | Lee et al. ............... 455/408 |
| 2013/0227668 A1 | 8/2013 | Mocanu |
| 2014/0096215 A1* | 4/2014 | Hessler ............... 726/7 |
| 2014/0380444 A1 | 12/2014 | Kelley |

\* cited by examiner

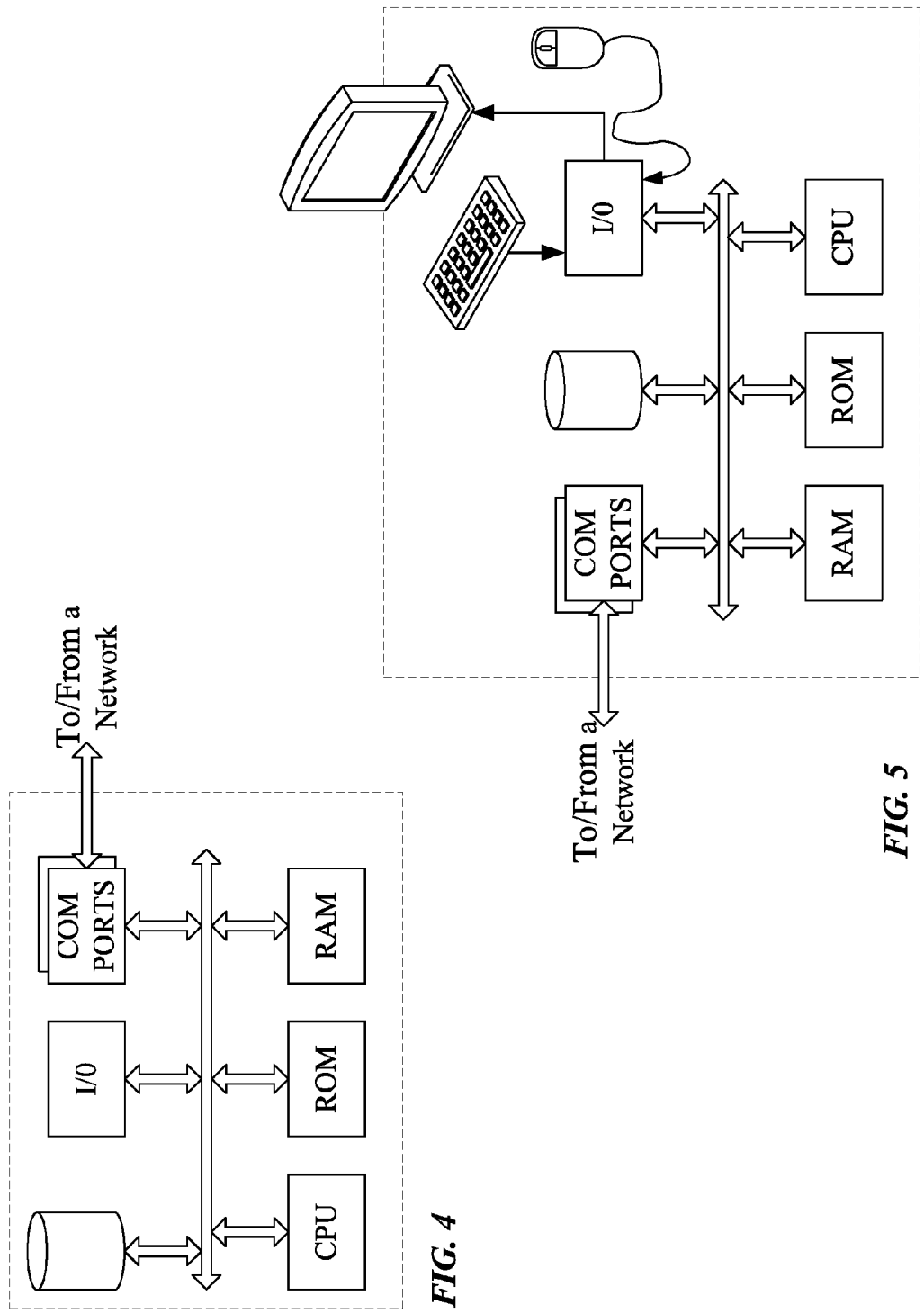

REMOTE AUTHENTICATION USING MOBILE SINGLE SIGN ON CREDENTIALS

CROSS-REFERENCE TO RELATED APPLICATIONS

This application is related to U.S. patent application Ser. No. 14/069,145, concurrently filed herewith and titled "MOBILE BASED LOGIN VIA WIRELESS CREDENTIAL TRANSFER," U.S. patent application Ser. No. 14/069,323, concurrently filed herewith and titled "MOBILE AUTHENTICATION FOR WEB PAYMENTS USING SINGLE SIGN ON CREDENTIALS," and U.S. patent application Ser. No. 14/069,310, concurrently filed herewith and titled "CONNECTED AUTHENTICATION DEVICE USING MOBILE SINGLE SIGN ON CREDENTIALS." The entire content of the above-identified applications are incorporated herein by reference.

BACKGROUND

In technology today, there is a constant struggle to find an acceptable compromise between convenience and security. Little of either can result in the failure of software, from a user perspective, which directly impacts the business. As users continue to sign up for more websites and services that require authentication, newer, more secure and convenient authentication methods may be desirable to be developed to protect user data, while providing a reliable system for authentication that relies less on users memorizing input credentials, such as passwords. As the foregoing illustrates, a new authentication technique that delivers a more enjoyable and less cumbersome user experience without comprising security may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 is a simplified functional block diagram of a computer that may be configured to function as the proxy server or the web server shown in FIG. 1; and FIG. 5 is a simplified functional block diagram of a personal computer or other work station or terminal device.

DETAILED DESCRIPTION

Figure 1:
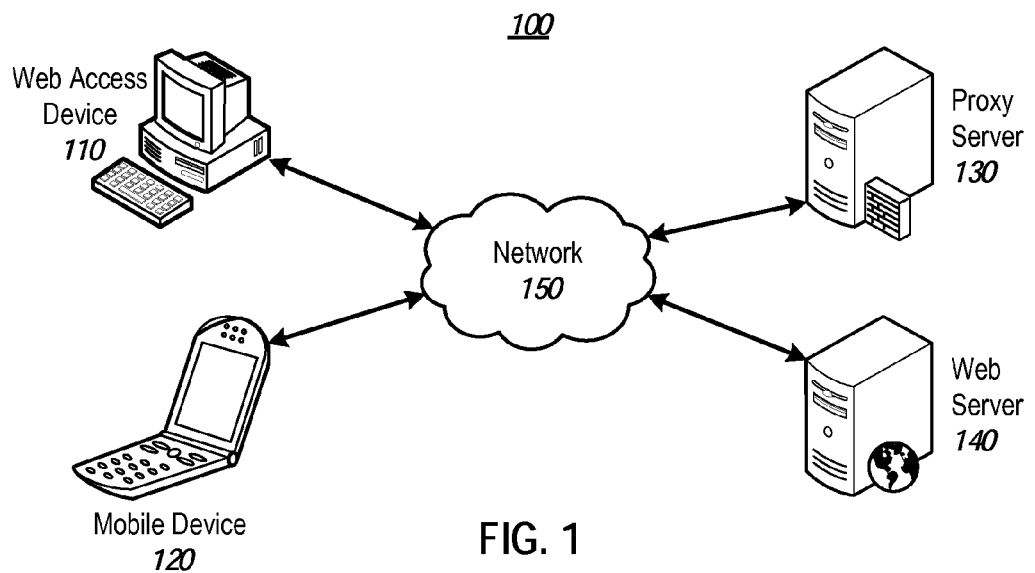
FIG. 1 illustrates an exemplary system for accessing an online resource.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Users typically register to access many different online resources, for example, email service(s), banking service(s), brokerage service(s), utility service(s), social network(s), online store(s), video viewing service(s), newspapers(s), etc. In order to access an online resource, a user may need to provide login credentials for the online resource. However, remembering multiple different login credentials may be cumbersome for a user. At the same time, the login credentials may be needed to provide security and to prevent unauthorized persons from accessing the online resources. To this end, the subject technology provides, among other things, a new authentication method for enabling user access to an online resource using a combination of a web access device and a mobile device associated with the user.

In some implementations, the authentication method includes receiving, at a proxy server and from a web access device, a request to access a secure online resource via the web access device and receiving, at the proxy server and from a mobile device different from the web access device, one or more credentials for accessing the online resource. The web access device may correspond to a personal laptop or desktop computer of the user and the mobile device may correspond to the mobile phone of the user. The web access device and the mobile device may be in communication with each other through the proxy server. Upon receiving the request from the web access device and receiving the credentials from the mobile device, the proxy server may determine whether a geographic distance between the web access device and the mobile device is less than a geographic distance threshold. Upon determining that the geographic distance between the web access device and the mobile device is less than the geographic distance threshold, the proxy server may enable the web access device access to the secure online resource. Advantageously, with the disclosed technology, a user may be provided with secure access to an online resource without having to remember login credentials, such as a username or a password. Also, advantageously for sellers of mobile device(s) or service plan(s), the utility of the mobile device is increased and more users may be encouraged to purchase a mobile device.

The proxy server may use one or more of several techniques to determine whether a geographic distance between the web access device and the mobile device is less than a geographic distance threshold. In one example, the proxy server determines this by transmitting to the web access device a second credential and receiving from the mobile device an indication of the second credential. The second credential may include a text, and the indication of the second credentials may include the user's entry of the text on the mobile device. The proxy server then determines whether the indication of the second credential received from the mobile device correspond with the second credential sent to the web access device. Upon determining that the indication of the second credential received from the mobile device corresponds with the second credential sent to the web access device, the proxy server determines that the geographic distance between the web access device and the mobile device is less than the geographic distance threshold.

In another example, the proxy server receives, from the mobile device, the geographic location of the mobile device, and receives, from the web access device, the geographic location of the web access device. Either the mobile device or the web access device may determine it geographic location based on accessible global positioning system (GPS), WiFi, cellular, or Internet Protocol (IP) address signal(s). The proxy server computes the geographic distance between the geographic location of the mobile device and the geographic location of the web access device. Thus, in one example, direct determination of the individual locations of the mobile device and the web access device (e.g., using GPS) may be avoided, instead using a relative location by the above indirect method. In other embodiments, direct location determination may be used as the sole location determination technique or may be used in combination with the indirect determination technique to confirm the relative location thereby for an added layer of security.

To illustrate one specific example, a user may use a web access device (e.g., a laptop or desktop computer running a web browser) to access a secure online resource and may use a mobile device (e.g., a mobile phone) to authenticate the user's access to the online resource. In this scenario, the user may be working on a desktop computer in his/her office and have his/her mobile phone in his/her pocket. Using a web browser on the web access device, the user may access the webpage of the online store at the web address store.example-.com. The access to the online resource may require valid credentials (e.g., a username and a password). The user may seek the valid credentials from the mobile device. Specifically, the user may request at the web access device or at the mobile phone that a machine (e.g., the proxy server) authenticate the user's access to the online resource via the web access device using credentials stored at the mobile device. The machine (e.g., the proxy server) may have previously received the user's credential from the mobile device or may subsequently receive this information and may authenticate the user's access to the online resource. Upon receiving the request and prior to enabling the user's access to the online resource, the machine (e.g., the proxy server) may determine whether the web access device is within close proximity of the mobile device. If so, the machine (e.g., the proxy server) may provide the authentication information to the web access device for enabling access to the online resource without the user entering additional access information via the web access device. If, however, the machine (e.g., the proxy server) determines that the two devices are more than a threshold distance apart from each other, the machine (e.g., the proxy server) does not enable the user's access to the online resource via the web access device without the user entering the required access information via the web access device.

FIG. 1 illustrates an exemplary system 100 for accessing an online resource. As shown, the system 100 includes a web access device 110, a mobile device 120, a proxy server 130, and a web server 140 connected to one another via a network 150. The network 150 may include any network(s), for example, the Internet, an intranet, a virtual private network, a local area network, a wide area network, a wired network, a wireless network, etc. While a single web access device 110, mobile device 120, proxy server 130, and web server 140 are illustrated, the subject technology may be implemented in conjunction with any number of web access device(s), mobile device(s), proxy server(s), and web server(s).

The web access device 110 may be any computing device, for example, a personal computer, a desktop computer, a laptop computer, a tablet computer, a mobile phone, a personal digital assistant (PDA), a digital music player, a smart watch, etc. The web access device 110 may include a web browser configured to display a website associated with an online merchant of the web server 140 or other application(s) for accessing other online resource(s) at the web server 140. For example, the web server 140 may be a server of a social networking service and the web access device 110 may include a web browser for accessing the social networking service or a special purpose application (e.g., a tablet computer application) for accessing the social networking service.

The mobile device 120 is separate and distinct from the computing device 110. The mobile device 120 may be any computing device, for example, a tablet computer, a mobile phone, a personal digital assistant (PDA), a digital music player, a smart watch, a key fob including a processor, a network interface, and a memory, etc. The mobile device 120 may locally store credentials (e.g., usernames and passwords) associated with the user or other identifying information (e.g., identity information coupled with a mobile directory number (MDN) or operating system identifier) of the user. Alternatively, the payment account information may be stored at a server (e.g., at proxy server 130) in association with the mobile device 120.

The proxy server 130 communicates with the mobile device 120 via the network 150. The proxy server 130 may be a server of a telephone company of the mobile device 120 or a server operating an application store of the mobile device 120. The proxy server 130 may be a server associated with a developer of an operating system of the mobile device 120. The proxy server 130 may be programmed to execute the process described below in conjunction with FIG. 2.

The web server 140 is associated with an online resource, for example, a website or a resource presented via an application that accesses the network 150. The web server 140 communicates with the web access device 110 to provide the online resource upon authenticating that the user is authorized to access the online resource. The web server 140 may authenticate that the user is authorized to access the online resource by receiving the user's login credentials (e.g., username and password) from the web access device 110, or by verifying the user's identity through the proxy server 130 and the mobile device 120.

Figure 2:
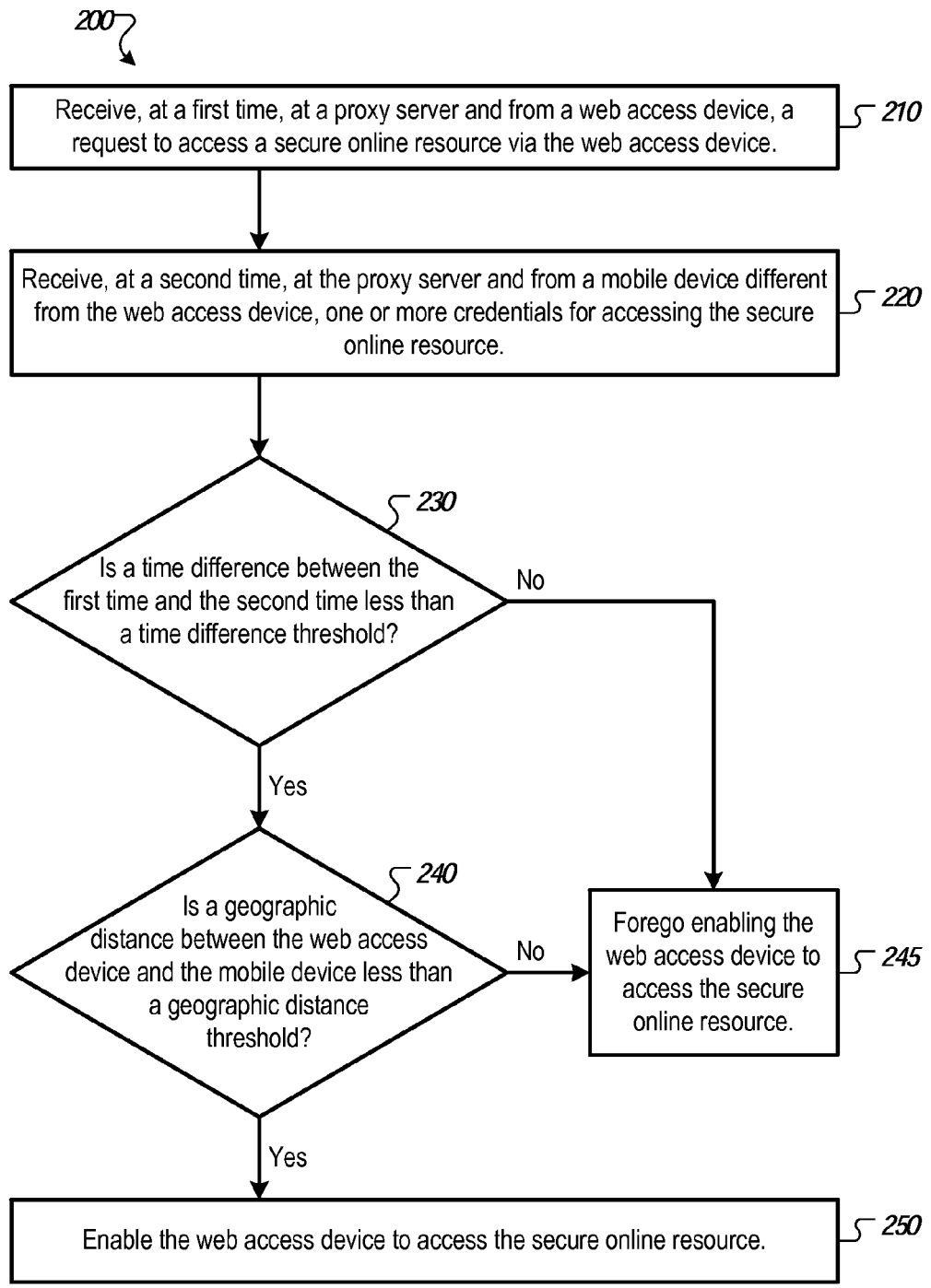
FIG. 2 illustrates an exemplary process for enabling access to a secure online resource.

FIG. 2 illustrates an exemplary process 200 for enabling access to a secure online resource. The process 200 begins at step 210, where a proxy server (e.g., proxy server 130) receives, at a first time and from a web access device (e.g., web access device 110), a request to access a secure online resource via the web access device. For example, the secure online resource can include bank account(s) viewed via an online banking website of a bank or via a tablet computer application of the bank. The user may select a button for mobile authentication in the online banking website or the tablet computer application. Alternatively, the user may press a hot key (e.g., a space bar on a keyboard) associated with mobile authentication. The hot key may be the same on all sites or may vary from site to site. The user may be provided with instructions, on the screen of the web access device, to use the mobile device to hit the hot key and identifying the hot key. For example, the screen of the computing device may display the text "Please hit the space bar of your keyboard with your mobile device," in the web browser displaying the webpage for making the mobile-based payment.

In step 220, the proxy server receives, at a second time and from a mobile device (e.g., mobile device 120) different from the web access device, one or more credentials for accessing the online resource. The mobile device may provide the credentials to the proxy server in response to being accelerated at an acceleration corresponding to hitting the hot key described above. Alternatively, the mobile device may provide the credentials in response to running an application on the mobile device, and receiving, via the application, an input (e.g., a button press) indicating that credentials should be transmitted. According to some examples, the user may need to solve a challenge (e.g., enter a pattern, a pin or a text-based password or move the mobile device according to a gesture) in order to have the mobile device transmit the credentials. Solving the challenge may be easier for the user than remembering multiple passwords for multiple different websites, as the user may need to memorize only one solution for one challenge. In some cases, the challenge may be a biometric challenge, and the solution to the biometric challenge (e.g., the user's fingerprint or the image of the user's face) may be stored locally at the mobile device and not provided to the proxy server. The proxy server may be notified, based on information stored at the mobile device, whether the user has correctly resolved the challenge. The one or more credentials may include a username and a password for accessing the online resource. The one or more credentials may be stored locally at the mobile device, for example in a memory associated with a mobile authentication application of the mobile device. Alternatively, the web server may store the one or more credentials in conjunction with information identifying the mobile device (e.g., an MDN or an operating system identifier of the mobile device) and the proxy server may receive, from the mobile device, the information identifying the mobile device in order to authenticate the user. In this case, the mobile device may or may not store the credentials used to authenticate the user (such credentials being used when the mobile device is itself, rather than the web access device, used to access the online resource) but does not provide the credentials to the proxy server, supplying instead the information identifying the mobile device. The proxy server may notify the web server that the user associated with the information identifying the mobile device is attempting to access the online resource at the web server. Oftentimes, a mobile device (e.g., a mobile phone) has a single user who usually has the mobile device on his/her person. Thus, possession of the mobile device may be used to identify the user. Possession of the mobile device may be determined based on geographic proximity of the mobile device to the web access device or based on information (e.g., a pattern, a text, a hand gesture, etc.) being presented at one of the mobile device or the web access device and entered into the other of the mobile device or the web access device.

In some examples, the information identifying the mobile device includes an identification of the mobile telephony account of the mobile device. For instance, the secure online resource may be an online store, and the identification of the mobile telephony account may include payment account information, contact information, or shipping information. The payment account information may include a payment account number (e.g., credit card number) or instructions for adding a charge to the user's monthly mobile telephony bill. For example, if a user makes a purchase at the online store for $50, his/her monthly mobile telephony bill for the current month may be increased by $50.

In yet another example, the one or more credentials may include a biometric scan for identifying a user account of the user. The biometric scan may include a fingerprint scan or a facial scan. The biometric scan may be taken at the mobile device and verified based on data stored locally at the mobile device. The mobile device may then send, to the proxy server, an indication whether the biometric scan was successful without sending the user's biometric information (e.g., fingerprint or facial information). Thus, the user may be able to use biometric data to authenticate him/herself without providing the biometric data to a server that is not controlled by the user, such as the proxy server or the web server.

According to some implementations, the steps 210 and 220 correspond to a user hitting a button (e.g., a space bar on a keyboard) of the web access device with the mobile device. The web access device transmits the request to access the secure online resource in response to the hitting of the button (e.g., with any object, including the mobile device or a finger) on the web access device. The mobile device transmits the one or more credentials for accessing the secure online resource in response to an acceleration of the mobile device corresponding to a hitting of an object (e.g., the button or another object) with the mobile device. The mobile device and the computing device may be proximate to one another (e.g., within the threshold distance of one another) at the time the mobile device hits the button of the web access device and the user may be authenticated based on the user's possession of the mobile device. The acceleration of the mobile device may be measured by an accelerometer within the mobile device. Some mobile devices (e.g., the Apple iPhone 4S®) include an accelerometer to allow a user to play games that involve accelerating the mobile device or measure the user's acceleration when engaging in fitness activities, among other things.

In step 230, the proxy server determines whether a time difference between the first time and the second time is less than a time difference threshold (e.g., 2 seconds or 5 seconds). If so, the process 200 continues to step 240. If not, the process 200 continues to step 245.

In step 240, the proxy server determines whether a geographic distance between the web access device and the mobile device is less than a geographic distance threshold (e.g., 5 meters or 15 meters). The proxy server may receive the geographic location from the web access device and from the mobile device and compute the geographic distance based on the received geographic locations. The computed geographic distance may be compared to the geographic distance threshold. Each of the web access device and the mobile device may determine its own geographic location based on accessible GPS, WiFi, cellular, or IP address signal(s). Alternatively, the proxy server may determine the geographic location(s) of the web access device or the mobile device based on indicia of the above signals transmitted from the web access device or the mobile device to the proxy server.

In one example, to determine that the geographic distance between the web access device and the mobile device is less than the geographic distance threshold, the proxy server may transmit, from the proxy server to the web access device, a second credential (e.g., a gesture, a motion, a pattern, or a pin). The proxy server may receive, from the mobile device, an indication of the second credential. For example, the user may make the gesture or motion with the mobile device or enter the pattern or the pin into the mobile device. The proxy server may determine whether the indication of the second credential received from the mobile device corresponds with the second credential sent to the web access device. Upon determining that the indication of the second credential received from the mobile device corresponds with the second credential sent to the web access device, the proxy server determines that the geographic distance between the web access device and the mobile device is less than the geographic distance threshold, as the user was able to perceive the second credential at the web access device and provide the second credential to the mobile device at substantially the same time (e.g., within a time period shorter than 10 seconds, 1 minute, 2 minutes, etc.). The time period may depend on the type of second credential to be entered. For example, the time period for entering a second credential including a pin may be 30 seconds, while the time period for entering a second credential including a gesture may be 15 seconds.

The second credential may include text (e.g., the word "afternoon"), and the indication of the second credential may include the user's entry of the text on the mobile device. The second credential may include an image displayed on a display device of the web access device, and the indication of the second credential may include a photograph of the image taken via a camera of the mobile device. The second credential may include a movement pattern, and the indication of the second credential may include indicia of moving the mobile device according to the movement pattern. The second credential may include an audio output or text for a user to read, and the indication of the second credential may include an audio input. If the geographic distance is determined to be less than the geographic distance threshold, the process 200 continues to step 250. Otherwise, the process 200 continues to step 245.

In step 245, if the time difference between the first time and the second time exceeds the time difference threshold or the geographic distance between the web access device and the mobile device exceeds the geographic distance threshold, the proxy server foregoes enabling the web access device to access the secure online resource. The proxy server may send an authentication error message to the web access device or to the mobile device, requesting that the user reattempt mobile authentication or use another authentication technique, for example, manually entering a username and password. The user may be able to reattempt mobile authentication at most a threshold number of times (e.g., three times) before receiving a failure message. Each reattempt may include providing a failure message to the user, asking, via the web access device or the mobile device, the user to reattempt mobile authentication, and receiving a user input for reattempting mobile authentication. The threshold number of times may be dependent on the credential type (e.g., username/password or certificate) or the particular website and level of access granted. For example, for a banking service, the threshold number of times may be three; for an email service, the threshold number of times may be five. For a regular user, with stored credentials for fewer than 100 services, the threshold number of times may be six. For a super-user, with stored credentials for 100 or more services, the threshold number may be four. Upon receiving the failure message, the user may be requested to re-register his/her mobile device for mobile authentication. The re-registration may be completed, for example, via a website associated with the proxy server or by visiting a business (e.g., a store of a telephone company or an operating system developer or manufacturer) associated with the proxy server. After step 245, the process 200 ends.

In step 250, if the time difference between the first time and the second time is less than the time difference threshold and the geographic distance between the web access device and the mobile device is less than the geographic distance threshold, the proxy server enables the web access device to access the secure online resource. For example, the proxy server may forward login credentials from the mobile device to the web access device. Alternatively, the proxy server may signal the web server to provide the secure online resource to the web access device. The signal transmitted from the proxy server to the web server may identify the web access device and the user. The user may be identified using one or more of a username and a password or an identifier of the mobile device. After step 250, the process 200 ends.

As shown, the steps 210-250 of the process 200 are implemented according to a certain order and in series. However, the steps 210-250 of the process 200 may be implemented in any order. In some cases, two or more of the steps 210-250 of the process 200 may be implemented in parallel.

Figure 3:
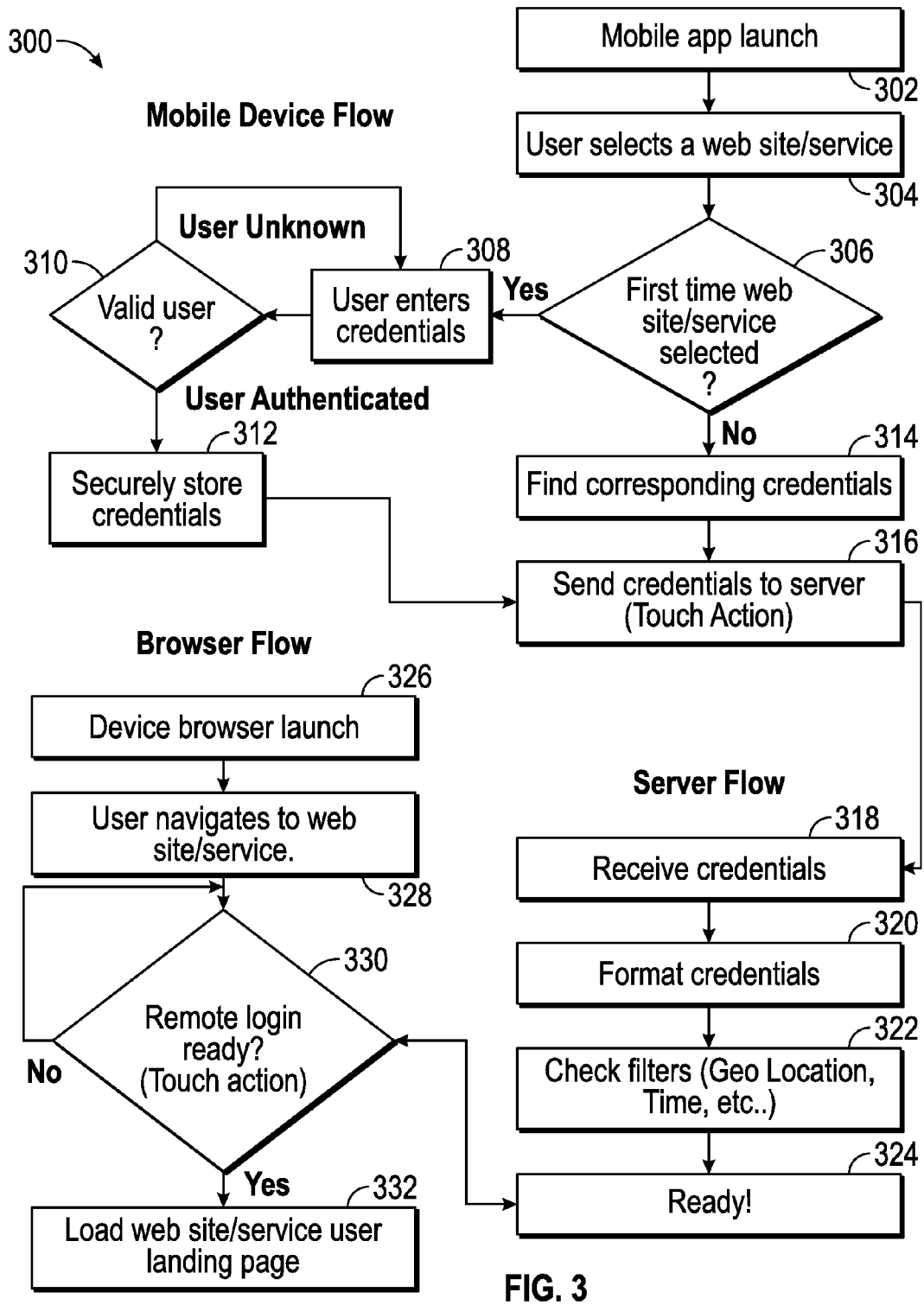
FIG. 3 illustrates an exemplary processes for providing, at a browser on a web access device, access to a website or service based on credentials stored at a mobile device.

FIG. 3 illustrates an exemplary process 300 for providing, at a browser on a web access device, access to a website or service based on credentials stored at a mobile device that is different from the web access device. The steps of the processes 300 may be implemented in series or in parallel and in any order, not necessarily in the order shown. According to some aspects, two or more steps of the processes 300 are implemented simultaneously.

As shown in FIG. 3, the process 300 begins at step 302, where, at the mobile device (e.g., mobile device 120), a mobile app is launched. The mobile app is for authenticating a web access device (e.g., web access device 110) to access a secure online resource, such as a website or a service. In step 304, the user selects a website or a service to access via the mobile app. In step 306, the mobile device determines whether this is the first time that the website or the service was selected. If so, the process 300 continues to step 308. If not, the process 300 continues to step 314.

In step 308, if this is the first time the user selected the website or the service, the user enters his/her credentials. The credentials are the same credentials as those for normal access, for example, the same username and password. In step 310, the mobile device determines, for example, by accessing a web server (e.g., web server 140) whether the user is a valid user, in other words, whether the user entered valid credentials. The mobile device may send a message to the web server asking the web server to verify whether the user has successfully logged into the website and receive a response from the web server. If the credentials are invalid, the process 300 returns to the step 308 and the user is able to re-enter his/her credentials. If the credentials are valid, the process 300 continues to step 312, where the mobile device securely stores the credentials. After step 312, the process 300 continues to step 316.

In step 314, if this is not the first time the user selected the website or the service, the mobile device finds the corresponding credentials for the website or the service. The corresponding credentials for the website or the service may be stored in the memory of the mobile device in association with the mobile app. In step 316, the mobile device sends the credentials to the proxy server (e.g., proxy server 130) for processing at the proxy server. The mobile device may send the credentials to the proxy server in response to a touch action by the user at the mobile device.

In step 318, the proxy server receives the credentials from the mobile device. In some examples, after receiving the credentials from the mobile device, the proxy server may proceed directly to step 320, described below. In some examples, further authenticating that the user of the mobile device and the user of the browser is the same person may be desirable. Further authentication may be desirable for access to highly sensitive websites or services, for example, online banking services or online brokerage services. Less sensitive websites or services may include social networking services or newspaper services. In these examples, before executing the step 320, the proxy server may send a challenge to the browser at the web access device and receive a response to the challenge from the mobile device. The challenge does not involve the user having to remember passwords or usernames, instead being based on the user physically interacting with the mobile device in a manner specified by the web access device—that is a user-mediated transfer of audible/visual information at the web access device to the mobile device instead of a direct (wired or wireless) transfer the information from the web access device to the mobile device. The challenge may be selected based on options selected by either the user or the online service provider. For example, the user may specify that he/she wishes to enter a pin in order to more securely authenticate mobile-based login to a web service. In some cases, an online service provider may specify that a user needs to take a picture, using the mobile device, of an image on a screen of the web access device to authenticate the user's access to the online service. In some examples, multiple challenges may be used to satisfy the requirements of both the user and the online service provider. The proxy server verifies the response to the challenge received from the mobile device and proceeds to step 320 in response to verifying that the response to the challenge is correct. If the response to the challenge is incorrect, the user may be prompted to re-enter the response to the challenge or given a new challenge and prompted to enter a response to the new challenge. After entering a threshold number of incorrect responses, the user may be prevented from using mobile authentication until the user re-registers with the proxy server and verifies that he/she still has possession of the mobile device.

The challenge may include a gesture that is displayed at the browser, and the user may respond to the challenge by making the gesture with the mobile device. The challenge may include a motion, and the user may respond to the challenge by making the motion with the mobile device. The challenge may include a pattern, and the user may respond to the challenge by drawing the pattern on the mobile device. The challenge may include a pin, and the user may respond to the challenge by typing the pin into the mobile device.

In step 320, the proxy server formats the credentials for processing via a web access device (e.g., web access device 110) or via a web server (e.g., web server 140). In step 322, the proxy server checks filters, for instance the geographic location or the time when the credentials and the web access requests were received, as discussed above, for example, in conjunction with FIG. 2. In step 324, the proxy server is ready to provide the website or the service to the web access device.

At the browser executing on the web access device, in step 326 the browser of the web access device is launched. In step 328, the user navigates the browser to the website or the service. In step 330, the browser determines whether remote login, at the proxy server, is ready (e.g., whether the server has executed step 324). If not, the browser waits until the remote login is ready at the proxy server or until the user requests another authentication technique, for example, manually entering a username and a password. If so, in step 332, the browser loads the user landing page of the website or the service. After step 332, the process 300 ends.

FIGS. 4 and 5 provide functional block diagram illustrations of general purpose computer hardware platforms. FIG. 4 illustrates a network or host computer platform, as may typically be used to implement a server. FIG. 5 depicts a computer with user interface elements, as may be used to implement a personal computer or other type of work station or terminal device, although the computer of FIG. 5 may also act as a server if appropriately programmed. It is believed that the general structure and general operation of such equipment as shown in FIGS. 4 and 5 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 5). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the methods of managing information about content transmission outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the application(s) 150, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a Blu-ray disc read-only memory (BD-ROM), CD-ROM, DVD or DVD-ROM, any other optical medium, punch cards paper tape, any other physical storage medium with patterns of holes, a RAM, a PROM and EPROM, a FLASH- EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

These general and specific aspects may be implemented using a system, a method, a computer program, a computer readable medium, or an apparatus or any combination of systems, methods, computer programs, computer readable mediums, and/or apparatuses While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, at a proxy server and from a web access device, a request to access a secure online resource via the web access device, the request to access the secure online resource being provided to the proxy server and from the web access device in response to hitting a button on the web access device;
   receiving, at the proxy server and from a mobile device different from the web access device, one or more credentials for accessing the secure online resource, the one or more credentials being provided to the proxy server from the mobile device in response to a detected acceleration of the mobile device;
   determining that a geographic distance between the web access device and the mobile device is less than a geographic distance threshold; and
   upon determining that the geographic distance between the web access device and the mobile device is less than the geographic distance threshold, enabling the web access device access to the secure online resource,
   wherein the detected acceleration of the mobile device corresponds to the mobile device accelerating while hitting the button on the web access device using the mobile device.

2. The method of claim 1, further comprising:
   determining a time difference between a first time of receiving, at the proxy server, the request to access the secure online resource via the web access device, and a second time of receiving, at the proxy server, the one or more credentials from the mobile device, wherein the web access device is enabled to access the secure online resource upon determining that the time difference is less than a time difference threshold.

3. The method of claim 1, wherein:
   the web access device includes a personal computer having a web browser application, and
   the mobile device includes a mobile phone.

4. The method of claim 3, wherein the one or more credentials include a username and a password associated with accessing the secure online resource.

5. The method of claim 3, wherein the one or more credentials include an identification of a mobile telephony account.

6. The method of claim 5, wherein:
   the secure online resource includes an online store, and
   the identification of the mobile telephony account is associated, at the proxy server, with one or more of payment account information, contact information, or shipping information.

7. The method of claim 1, wherein the one or more credentials include a result of a biometric scan for identifying a user account, and wherein biometric information of the user is not received at the proxy server.

8. The method of claim 1, wherein determining that the geographic distance between the web access device and the mobile device is less than the geographic distance threshold includes:

determining a geographic location of the web access device, determining a geographic location of the mobile device, computing the geographic distance between the geographic location of the web access device and the geographic location of the mobile device, and comparing the geographic distance between the geographic location of the web access device and the geographic location of the mobile device with the geographic distance threshold.

9. The method of claim 1, wherein determining that the geographic distance between the web access device and the mobile device is less than the geographic distance threshold includes:

transmitting, from the proxy server and to the web access device, a second credential, receiving, from the mobile device and at the proxy server, an indication of the second credential, wherein the indication of the second credential is received at the proxy server within a threshold amount of time after the second credential is transmitted from the proxy server to the web access device, determining whether the indication of the second credential received from the mobile device correspond with the second credential sent to the web access device, and upon determining that the indication of the second credential received from the mobile device corresponds with the second credential sent to the web access device, determining that the geographic distance between the web access device and the mobile device is less than the geographic distance threshold.

10. The method of claim 9, wherein determining that the geographic distance between the web access device and the mobile device is less than the geographic distance threshold is based only on determining that the indication of the second credential received from the mobile device corresponds with the second credential sent to the web access device.

11. The method of claim 9, wherein:
the second credential includes text, and
the indication of the second credentials includes the user's entry of the text on the mobile device.

12. The method of claim 9, wherein the second credential includes an image displayed via a display device, and wherein the indication of the second credential includes a photograph of the image.

13. The method of claim 9, wherein the second credential includes a movement pattern, and wherein the indication of second credential includes indicia of moving the mobile device according to the movement pattern.

14. The method of claim 9, wherein the second credential includes an audio output or text for a user to read, and wherein the indication of the second credential includes an audio input.

15. The method of claim 1, wherein the button on the web access device comprises a space bar on a keyboard of the web access device.

16. A non-transitory computer-readable medium comprising instructions which, when executed by one or more computers, cause the one or more computers to:

receive, at a proxy server and from a web access device, a request to access a secure online resource via the web access device, the request to access the secure online resource being provided to the proxy server and from the web access device in response to hitting a button on the web access device;

receive, at the proxy server and from a mobile device different from the web access device, one or more credentials for accessing the secure online resource, the one or more credentials being provided to the proxy server from the mobile device in response to a detected acceleration of the mobile device;

determine that a geographic distance between the web access device and the mobile device is less than a geographic distance threshold; and upon determining that the geographic distance between the web access device and the mobile device is less than the geographic distance threshold, enable the web access device access to the secure online resource, wherein the detected acceleration of the mobile device corresponds to the mobile device accelerating while hitting the button on the web access device using the mobile device.

17. The non-transitory computer-readable medium of claim 16, further comprising instruction which, when executed by the one or more computers, cause the one or more computers to:

determine a time difference between a first time of receiving, at the proxy server, the request to access the secure online resource via the web access device, and a second time of receiving, at the proxy server, the one or more credentials from the mobile device, wherein the web access device is enabled to access the secure online resource upon determining that the time difference is less than a time difference threshold.

18. The non-transitory computer-readable medium of claim 16, wherein:

the web access device includes a personal computer of a user having a web browser application, and the mobile device includes a mobile phone of the user.

19. A system comprising:

one or more processors; and a memory comprising instructions which, when executed by the one or more processors, cause the one or more processors to:

receive, at a proxy server and from a web access device, a request to access a secure online resource via the web access device, the request to access the secure online resource being provided to the proxy server and from the web access device in response to hitting a button on the web access device;

receive, at the proxy server and from a mobile device different from the web access device, one or more credentials for accessing the secure online resource, the one or more credentials being provided to the proxy server from the mobile device in response to a detected acceleration of the mobile device;

determine that a geographic distance between the web access device and the mobile device is less than a geographic distance threshold; and upon determining that the geographic distance between the web access device and the mobile device is less than the geographic distance threshold, enable the web access device access to the secure online resource, wherein the detected acceleration of the mobile device corresponds to the mobile device accelerating while hitting the button on the web access device using the mobile device.

* * * * *